United States Patent Office 3,472,781
Patented Oct. 14, 1969

3,472,781
HYDRAULIC FLUIDS
Walter J. Ziemba, White Plains, N.Y., assignor to Union Carbide Corporation, a corporation of New York
No Drawing. Filed June 22, 1966, Ser. No. 559,425
Int. Cl. C10m 3/26, 3/14, 3/02
U.S. Cl. 252—75
2 Claims

ABSTRACT OF THE DISCLOSURE

A hydraulic fluid useful as a central hydraulic fluid containing a polyoxyalkylene copolymer, ethers of triethylene glycol and diethylene glycol, an antioxidant, sorbitan monooleate, a dialkylamine and an alkali metal nitrite.

The invention relates to a polyoxyalkylene-based hydraulic fluid which is broadly useful in many kinds of hydraulic systems and which meets the strict requirements that have been set for automobile central hydraulic system fluids.

It has been proposed to adopt a central hydraulic system in automobiles. The advantage of such a system is that one central power source can be employed to actuate many component parts, thereby eliminating the need for a separate hydraulic system for each one. Among the automotive component parts that can be actuated from a single central hydraulic system are the brakes, steering mechanism, windshield wipers, air conditioning, convertible tops, clutches, and the like.

The requirements for a fluid to be employed in an automotive central hydraulic system are strict. The fluid must be operable over a wide temperature range, it must have a high boiling point and flash point, it must have good lubricity and anti-wear properties, it must not corrode the metal parts of the hydraulic system nor cause an excessive amount of swelling of rubber gaskets, and the like. Many of the commercially available hydraulic fluids can meet some of the requirements, but none could meet them all. The present invention is based upon the discovery that a unique seven-component, polyoxyalkylene-based fluid meets the strict requirements that have been set for central hydraulic system fluids.

The hydraulic fluid of the invention is composed of:

(1) a mixed polyoxyethylene-polyoxypropylene copolymer,
(2) a monoalkyl ether of triethylene glycol,
(3) a monoalkyl ether of diethylene glycol,
(4) an antioxidant,
(5) sorbitan monooleate,
(6) a dialkylamine, and
(7) alkali metal nitrite.

The mixed polyoxyethylene-polyoxypropylene copolymer is a type that is well known in the art. These copolymers can be produced by reacting a mixture of ethylene oxide and propylene oxide with a monohydric alcohol, water, or a dihydric alcohol as a starter. Illustrative starters include methanol, ethanol, propanol, butanol, hexanol, octanol, water, ethylene glycol, diethylene glycol, propylene glycol, dipropylene glycol, butylene glycol, and the like. The copolymer normally contains from about 50 to 75 weight percent oxypropylene groups and from about 25 to 50 weight percent oxyethylene groups. The molecular weight of the copolymer can be from about 300 to about 15,000, and when the hydraulic fluid of the invention is employed as an automobile central hydraulic systems fluid, the molecular weight is preferably from about 700 to about 3500. The nature and production of the copolymers are well known in the art, as is illustrated by U.S. Patent Nos. 2,425,755 (Roberts et al.) and 2,425,845 (Toussaint et al.). The copolymer is employed in an amount effective to impart lubricating properties to the hydraulic fluid. This amount will vary to a limited degree, depending on the exact nature of the copolymer (e.g., depending on the exact molecular weight and upon the oxyethylene to oxypropylene ratio), but will usually be from about 10 to about 30 weight percent, based on weight of hydraulic fluid.

The hydraulic fluid of the invention also contains a monoalkyl ether of triethylene glycol and a monoalkyl ether of diethylene glycol. Specific illustrative examples of these glycol ethers include the monomethyl ether of triethylene glycol, the monoethyl ether of triethylene glycol, the monopropyl ether of triethylene glycol, the monobutyl ether of triethylene glycol, the monomethyl ether of diethylene glycol, the monoethyl ether of diethylene glycol, the monopropyl ether of diethylene glycol, the monobutyl ether of diethylene glycol, and the like. The monomethyl ether of triethylene glycol and the monobutyl ether of diethylene glycol are preferred. The glycol ether components are employed in amounts sufficient to impart low temperature fluidity to the hydraulic fluid. For instance, the triethylene glycol ether can be present in amounts of from about 40 to about 70 weight percent, and the diethylene glycol ether can be present in amounts of from about 10 to about 30 weight percent, the percentages being based upon weight of hydraulic fluid.

The hydraulic fluid of the invention contains an antioxidant such as phenyl-alpha-naphthylamine, phenyl-beta-naphthylamine, Agerite Resin D (polymerized trimethyl dihydroquinoline), t-butyl-para-cresol, and the like. The preferred antioxidant is phenyl-alpha-naphthylamine. The antioxidant is employed in an amount sufficient to stabilize the alkylene oxide copolymer and other ethers present against oxidation. For instance, useful amounts are from about 0.5 to about 1.5 weight percent, based on weight of hydraulic fluid.

The hydraulic fluid also contains as corrosion inhibitors a dialkylamine and an alkali metal nitrite. Useful dialkylamines include dipropylamine, dibutylamine, dipentylamine, dihexylamine, and the like. Dibutylamine is preferred. Sodium nitrite and potassium nitrite illustrate the alkali metal nitrites that can be employed. Sodium nitrite is preferred. The dialkylamine and alkali metal nitrite are employed in amounts sufficient to inhibit the hydraulic fluid against corrosion of metals. For instance, the dialkylamine can be employed in amounts of from about 0.3 to about 1 weight percent, and the alkali metal nitrite can be employed in amounts of from about 0.05 to about 0.3 weight percent, the percentages being based on weight of hydraulic fluid.

The hydraulic fluid contains sorbitan monooleate, which improves both corrosion and lubricity properties of the hydraulic fluid. This component is employed in small amounts, for instance, from about 0.5 to about 2 weight percent, based on weight of hydraulic fluid.

The hydraulic fluids of the invention can be prepared simply by mixing the above-described components. The said fluids have wide utility as hydraulic fluids, for instance, they are useful as brake fluids, in shock absorbers, in automobile power assist systems such as power steering and power brakes, and the like. The hydraulic fluids of the invention are the first fluids, and as of this time still the only fluids, that meet all of the requirements for use in an automobile central hydraulic system that would operate all of the hydraulic activated components in an automobile (e.g., power brakes, power steering, air conditioning unit, and the like).

The examples which follow illustrate the invention.

EXAMPLE 1

A hydraulic fluid was prepared from the following components:

| Component: | Parts, by wt. |
|---|---|
| Copolymer A [1] | 17.7 |
| Monomethyl ether of triethylene glycol | 59.6 |
| Monobutyl ether of diethylene glycol | 20.0 |
| Phenyl-alpha-naphthylamine | 1.0 |
| Sorbitan monooleate | 1.0 |
| Dibutylamine | 0.6 |
| Sodium nitrite | 0.1 |

[1] A copolymer prepared by reacting a 50:50 (by weight) mixture of ethylene oxide and propylene oxide with n-butanol. The copolymer had a viscosity at 100° F. of about 3520 Saybolt Universal Seconds and a molecular weight of about 2600.

The above-described fluid was subjected to the tests required by the SAE recommended practice 71 R–2 specifications for a central hydraulic system fluid. A description of each test and the performance of the fluid are displayed in the following table:

TABLE I.—CENTRAL HYDRAULIC SYSTEM FLUID REQUIREMENTS

| Test Description | Specification SAE 71 R–2 | Performance of Example 1 Fluid |
|---|---|---|
| Operating Range | −70° F. to +125° F | Passes. |
| Viscosity at— | | |
| 210° F | 4.5 cs. min | 4.5 |
| 130° F | No requirement | 10.4. |
| −40° F | 1,800 cs. max | 1,730. |
| Flash Point, °F | 205° F. min | 205° F. |
| Initial Boiling Point, °F | 400° F. min | 458° F. |
| Pour Point, °F | −70° F | Below −70° F. |
| Cold Test: | | |
| (a) 6 days at −50° F | −50° F. min | Passes −50° F. |
| (b) 6 hours at −70° F | −70° F. min | Passes −70° F. |
| Foaming | 100 ml. foam volume mas. at end of 5 minutes blowing period. No foam at end of 4 minutes settling period. | (a) Blowing, nil; (b) Settling, nil. |
| Anti-Wear | Pump delivery at 700 r.p.m. and 600 p.s.i. discharge shall not decrease more than 0.2 g.p.m. during 100 hours on test. Pump parts, by visual inspection, shall show no signs of excessive wear. | Passes. |
| Oxidation Stability | Rating 80 minimum, the oxidation stability shall be determined by SAE oxidation, Automatic Transmission, 300 hours at 275° F. and 2,150 r.p.m. | 91.0. |

| | Test Strip | Max. permissible loss mg. per sq. cm. of surface | |
|---|---|---|---|
| Corrosion Resistance | Tin Coated Iron (QQ-1-706A) | 0.2 | 0. |
| | Steel (SAE 1010 cold-rolled) | 0.2 | 0.01. |
| | Aluminum (SAE 24) | 0.1 | 0.02. |
| | Cast Iron (SAE 111) | 0.2 | 0.01. |
| | Brass (SAE 70-B) | 0.5 | 0. |
| | Copper (SAE 71) | 0.5 | 0.07. |

| Test Description | Specification SAE 71 R–2 | Performance of Example 1 Fluid |
|---|---|---|
| Seal Compatibility (Rubber Swelling) | GR-S rubber cups, 70 hours at 250±5° F. 5% max. | 4.0. |
| Lubrication | Test procedure A, 150,000 strokes at 158±5° F. and 500±50 p.s.i. with natural rubber cups. Test procedure B, 70,000 strokes at 250±5° F. and 1,000±50 p.s.i. with standard GR-S rubber cups. | Passes. |
| Water Tolerance | 3.5% water. One sample shall be maintained at a temperature of 140° F. and the other at −40° F. for a period of 24 hours. Fluid shall be examined for stratification and precipitation. | Do. |
| Compatibility | No liquid stratification or precipitation shall be evident. | Do. |

EXAMPLE 2

When sorbitan monooleate was used in a proportion of 0.25 weight percent, lubricity characteristics of the fluid are such that pump failure occurs in about 5 minutes as was evidenced by excess noise. Upon dismantling the pump, definite signs of wear were observed.

EXAMPLE 3

With the fluid described in Example 1, when the monobutyl ether of diethylene glycol is replaced with monomethyl ether of triethylene glycol (i.e., when the diluent consists solely of the latter material), the low temperature viscosity of the fluid is too high and the fluid does not pass the −70° F. cold test.

EXAMPLE 4

With the fluid described in Example 1, when the monobutyl ether of diethylene glycol is employed as the sole diluent, the fluid does not pass the rubber swell test, is marginal in corrosion resistance (especially at elevated temperatures), and does not pass the 210° F. viscosity test.

EXAMPLE 5

With the fluid described in Example 1, when the sorbitan monooleate is replaced with morpholinium laurate (a known lubricity or anti-wear additive), excessive corrosion occurs during operation in a Mercomatic transmission unit at elevated temperatures (about 275° F.).

What is claimed is:
1. A hydraulic fluid consisting essentially of:
   (a) from about 10 to about 30 weight percent of a mixed polyoxyethylene-polyoxypropylene copolymer which contains from about 50 to 75 weight percent oxypropylene groups and from about 25 to 50 weight percent oxyethylene groups and which has a molecu- lar weight of from about 300 to about 15,000 and which has been produced by reacting ethylene oxide and propylene oxide with water, methanol, ethanol, propanol, butanol, hexanol, octanol, ethylene glycol, diethylene glycol, propylene glycol, dipropylene glycol or butylene glycol;

(b) from about 40 to about 70 weight percent of the monomethyl ether of triethylene glycol, the monoethyl ether of triethylene glycol, the monopropyl ether of triethylene glycol or the monobutyl ether of triethylene glycol;

(c) from about 10 to about 30 weight percent of the monomethyl ether of diethylene glycol, the monoethyl ether of diethylene glycol, the monopropyl ether of diethylene glycol or the monobutyl ether of diethylene glycol;

(d) from about 0.5 to about 1.5 weight percent of phenyl-alpha-naphthylamine, phenyl - beta-naphthylamine, polymerized trimethyl dihydroquinoline or t-butyl-para-cresol;

(e) from about 0.5 to about 2 weight percent of sorbitan monooleate;

(f) from about 0.3 to about 1 weight percent of dipropylamine, dibutylamine, dipentylamine, or dihexylamine;

(g) from about 0.05 to about 0.3 weight percent of sodium nitrite or potassium nitrite, all percents being based on the weight of the hydraulic fluid.

2. The hydraulic fluid of claim 1 wherein said fluid consists essentially of:

(a) from about 10 to about 30 weight percent of a mixed polyoxyethylene-polyoxypropylene copolymer which has a molecular weight of from about 700 to about 3500;

(b) from about 40 to about 70 weight percent of the monomethyl ether of triethylene glycol, (c) from about 10 to about 30 weight percent of the monobutyl ether of diethylene glycol, (d) from about 0.5 to about 1.5 weight percent of phenyl-alphanaphthylamine, (e) from about 0.5 to about 2 weight percent of sorbitan monooleate, (f) from about 0.3 to about 1 weight percent of dibutylamine, and (g) from about 0.05 to about 0.3 weight percent of sodium nitrite, all percents being based on the weight of the hydraulic fluid.

References Cited

UNITED STATES PATENTS

| | | | |
|---|---|---|---|
| 3,080,322 | 3/1963 | Holzinger et al. | 252—78 X |
| 3,177,146 | 4/1965 | Francis | 252—75 |
| 3,346,501 | 10/1967 | Boehmer | 252—75 X |
| 3,377,288 | 4/1968 | Sawyer | 252—75 |

LEON D. ROSDOL, Primary Examiner

S. D. SCHWARTZ, Assistant Examiner

U.S. Cl. X.R.

252—73, 78; 260—615